United States Patent
Wang et al.

(10) Patent No.: US 12,030,994 B2
(45) Date of Patent: Jul. 9, 2024

(54) PREPARATION METHOD FOR AND APPLICATION OF MODIFIED SILOXANE-BASED SUPERCRITICAL CARBON DIOXIDE THICKENER

(71) Applicant: CHINA UNIVERSITY OF PETROLEUM, EAST CHINA, Qingdao (CN)

(72) Inventors: Yanling Wang, Qingdao (CN); Bin Liu, Qingdao (CN); Baojiang Sun, Qingdao (CN); Lei Liang, Qingdao (CN); Di Li, Qingdao (CN)

(73) Assignee: CHINA UNIVERSITY OF PETROLEUM, EAST CHINA (CN)

(*) Notice: Subject to any disclaimer, the term of this patent is extended or adjusted under 35 U.S.C. 154(b) by 0 days.

(21) Appl. No.: 18/025,666

(22) PCT Filed: Jul. 28, 2022

(86) PCT No.: PCT/CN2022/108441
§ 371 (c)(1),
(2) Date: Mar. 10, 2023

(87) PCT Pub. No.: WO2023/071332
PCT Pub. Date: May 4, 2023

(65) Prior Publication Data
US 2023/0391959 A1 Dec. 7, 2023

(30) Foreign Application Priority Data
Oct. 26, 2021 (CN) .......................... 202111248462.1

(51) Int. Cl.
*C08G 77/50* (2006.01)
*B01J 23/42* (2006.01)

(52) U.S. Cl.
CPC .............. *C08G 77/50* (2013.01); *B01J 23/42* (2013.01)

(58) Field of Classification Search
None
See application file for complete search history.

(56) References Cited

FOREIGN PATENT DOCUMENTS

| CN | 101896537 A | | 11/2010 |
|---|---|---|---|
| CN | 102171268 A | | 8/2011 |
| CN | 104497272 A | | 4/2015 |
| CN | 108003349 A | | 5/2018 |
| CN | 110862543 A | * | 3/2020 |
| CN | 112708138 A | | 4/2021 |
| CN | 112961360 A | | 6/2021 |
| CN | 113929915 A | | 1/2022 |
| JP | 2009126892 A | | 6/2009 |
| JP | 2010163520 A | | 7/2010 |
| JP | 2010285517 A | | 12/2010 |
| JP | 2010285518 A | | 12/2010 |
| JP | 2010285519 A | | 12/2010 |
| JP | 2011221192 A | | 11/2011 |
| JP | 2012089610 A | | 5/2012 |
| JP | 2015038211 A | | 2/2015 |

\* cited by examiner

*Primary Examiner* — Tae H Yoon

(57) ABSTRACT

A preparation method for and an application of a modified siloxane-based supercritical carbon dioxide thickener are disclosed. The method includes the following steps: using 1,3-diallyl-1,3,5-triazine-2,4,6-trione as a polymerization monomer, and dropwise adding 1,3,5,7-tetramethylcyclotetrasiloxane for hydrosilylation in the presence of a catalyst to obtain a modified siloxane polymer. The obtained modified siloxane polymer is directly used as a supercritical carbon dioxide thickener without purification post-treatment; when in use, the modified siloxane polymer is prepared into a solution with a concentration of 1-2%, has an excellent thickening effect with no cosolvent required, and has high solubility in carbon dioxide and high temperature resistance.

11 Claims, 2 Drawing Sheets

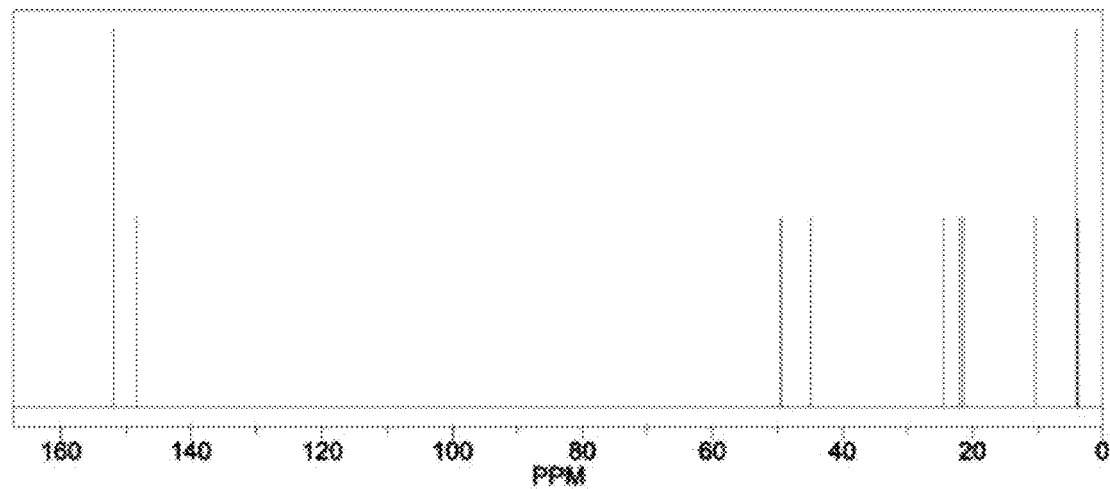
FIG. 3
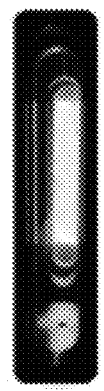  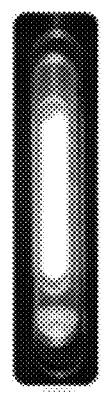  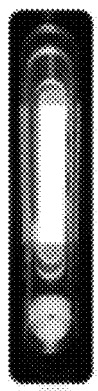
FIG. 4A  FIG. 4B  FIG. 4C

PREPARATION METHOD FOR AND APPLICATION OF MODIFIED SILOXANE-BASED SUPERCRITICAL CARBON DIOXIDE THICKENER

CROSS REFERENCE TO THE RELATED APPLICATIONS

This application is the national stage entry of International Application No. PCT/CN2022/108441, filed on Jul. 28, 2022, which is based on and claims priority to Chinese Application No. 202111248462.1, filed Oct. 26, 2021, the entire contents of which are incorporated herein by reference.

TECHNICAL FIELD

The present invention relates to a preparation method for and an application of a modified siloxane-based supercritical carbon dioxide thickener and belongs to the technical field of oil exploitation.

BACKGROUND

The exploration and development of unconventional oil and gas resources in China are still in their infancy and are restricted by complex geographical problems, ecological water resource problems and environmental problems to be solved in addition to facing difficulties in core technologies. The thickening mechanism of supercritical $CO_2$ thickeners covers the following key points: (1) on the premise that hydrocarbon polymer chain segments have sufficient flexibility, long polymer chains crossing and winding each other form irregular loose coils to capture and fix $CO_2$ molecules, so that they cannot move freely, having a thickening effect; (2) for surfactant-based thickeners, when the concentration used is equal to a critical micelle concentration (CMC), the micellar structure is spherical. When the concentration used is much higher than CMC, the micellar structure gradually changes into a worm-like structure, grows continuously, and further crosses and winds each other, thereby increasing the viscosity of $CO_2$; (3) for modified siloxane-based $CO_2$ thickeners, siloxanes do not interact with $CO_2$, and a three-dimensional network structure is formed mainly through interactions between cosolvent and two components (interaction between cosolvent and siloxane, and hydrogen bonding between cosolvent and $CO_2$ as Lewis acid-base pair) to thicken $CO_2$; (4) for fluorine-containing $CO_2$ thickeners, the fluorine element greatly reduces the cohesive energy of polymers, so that their molecular chains become more soluble in $SC-CO_2$ and form a network structure with a thickening effect when crossing and winding each other.

At present, fluorine-containing compounds or polymers are most commonly used in supercritical carbon dioxide thickeners. Such fluorine-containing substances cause great damages to the formation, groundwater resource pollution and environmental pollution, and have high biological toxicity and high cost. The price, environmental pollution, lack of available species and other factors of fluorine-containing substances have hindered their widespread use for fracturing stimulation in oil fields to some extent, while hydrocarbon polymers have low cost and less pollution, but the thickening effect is unsatisfactory.

In recent years, the research on siloxane-based supercritical carbon dioxide thickeners has been concerned. For example, CN112961360A provides a preparation method for a polygonal cage-shaped siloxane-based supercritical carbon dioxide thickener, including the following steps: (1) reacting hydroxyl double-terminated siloxane with sodium silanolate in an organic solvent to obtain double-sodium-terminated siloxane, and then reacting the double-sodium-terminated siloxane with hydrogen-containing chlorosilane to obtain monohydrogen-terminated siloxane; and (2) in the presence of a catalyst, carrying out a catalyst reaction on the monohydrogen-terminated siloxane in the cyclohexane solution of cage-shaped stereocyclosiloxane to obtain the polyhedral cage-shaped siloxane polymer. The obtained siloxane polymer has a good thickening capacity for thickening supercritical carbon dioxide. But the preparation method is relatively complex, and the comprehensive yield is unsatisfactory.

CN108003349A discloses a preparation method for a siloxane polymer-based supercritical carbon dioxide thickener for fracturing, including the following steps: carrying out a reflux reaction on aminopropylalkoxysilane hydrolyzate, tetramethyltetravinylcyclotetrasiloxane and other cyclosiloxanes under base catalysis to prepare an aminopropyl-terminated vinyl-side-chain modified polydimethylsiloxane; then, carrying out an acylchloride reaction on the aminopropyl-terminated vinyl-side-chain modified polydimethylsiloxane and aroyl chloride to obtain an aroyl amide-terminated side-chain modified siloxane polymer; dropwise adding an organic solvent solution of chloroplatinic acid to make the aroyl amide-terminated side-chain modified siloxane polymer react with hydrogen-containing siloxane to obtain a product. However, this synthesis method of the siloxane polymer is relatively complex, and the thickening effect of the siloxane polymer needs to be improved.

CN112708138A discloses a preparation method for a silsesquicyclosiloxane-based supercritical carbon dioxide thickener. The prepared supercritical carbon dioxide thickener has good solubility in supercritical carbon dioxide, and the dose of a cosolvent is reduced. Nevertheless, the prepared thickener is only soluble in supercritical $CO_2$ under the action of the cosolvent; in addition, multiple organic solvents (such as toluene, benzene and acetone) are used in the reaction of the method have relatively high toxicity, and the preparation process is complex.

Therefore, to overcome shortcomings in the prior art, it is necessary to develop a simply prepared supercritical carbon dioxide thickener with improved solubility and thickening property.

SUMMARY

To overcome the shortcomings in the prior art, the present invention provides a preparation method for a modified siloxane-based supercritical carbon dioxide thickener (SBD).

The present invention further provides an application of the prepared modified siloxane-based supercritical carbon dioxide thickener. Compared with the prior art, the modified siloxane polymer obtained in the present invention has a better thickening effect, higher solubility in supercritical carbon dioxide, and excellent temperature and pressure resistance, and no cosolvent is required.

The present invention adopts the following technical solution:

A preparation method for a modified siloxane-based supercritical carbon dioxide thickener includes the following steps:

adding 1,3-diallyl-1,3,5-triazine-2,4,6-trione into a reactor, stirring and heating to 60-120° C., adding chloroplatinic acid as a catalyst and keeping the catalyst activated for 1-3 h, wherein a catalyst activation temperature is 60-100° C.; then dropwise adding 1,3,5,7-tetramethylcyclotetrasiloxane for hydrosilylation at 70-110° C. to obtain a modified siloxane polymer (SBD), i.e., a modified siloxane-based supercritical carbon dioxide thickener.

The modified siloxane polymer (SBD) prepared in the present invention has a weight-average molecular weight of 8,000-11,000. The polymer is a colorless and transparent liquid directly used as a supercritical carbon dioxide thickener without purification post-treatment. No cosolvent is required in use.

According to the present invention, preferably, a molar ratio of carbonyl groups of the 1,3-diallyl-1,3,5-triazine-2,4,6-trione to active hydrogens of the 1,3,5,7-tetramethylcyclotetrasiloxane is 1-4:1. Further preferably, the molar ratio of carbonyl groups of the 1,3-diallyl-1,3,5-triazine-2,4,6-trione to active hydrogens of the 1,3,5,7-tetramethylcyclotetrasiloxane is 1-2:1. Most preferably, the molar ratio of carbonyl groups of the 1,3-diallyl-1,3,5-triazine-2,4,6-trione to active hydrogens of the 1,3,5,7-tetramethylcyclotetrasiloxane is 1.25:1.

According to the present invention, preferably, the catalyst activation temperature is 80-90° C.

According to the present invention, a dose of the chloroplatinic acid as a catalyst is preferably 25-60 ppm, and further preferably 35-50 ppm.

According to the present invention, the hydrosilylation temperature is the same as the catalyst activation temperature.

According to the present invention, the hydrosilylation time is preferably 2-20 h, and further preferably 4-8 h.

The modified siloxane polymer (SBD) prepared in the present invention is a network-structure polymer penetrated with straight chains. The polymer (SBD) prepared in the present invention is a mixture of chain-structure and network-structure polymerization forms penetrating and winding each other, which helps thicken supercritical carbon dioxide without a need for purification.

The modified siloxane polymer (SBD) prepared in the present invention has a structure shown in formula I. The reaction formula of the present invention is given below:

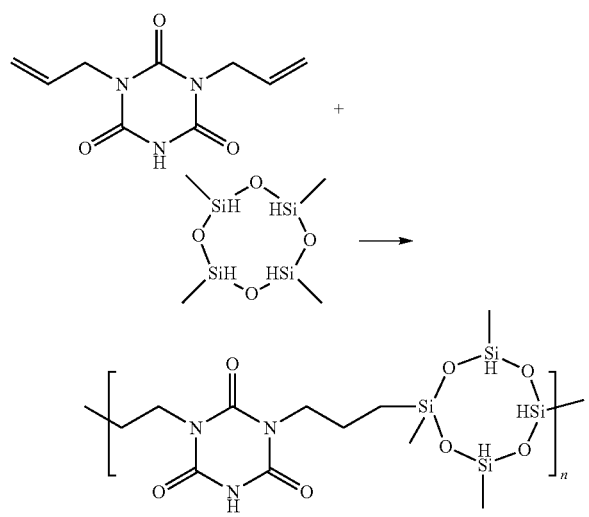

where n=17-24.

1,3-diallyl-1,3,5-triazine-2,4,6-trione and 1,3,5,7-tetramethylcyclotetrasiloxane are used as reaction monomers, and the product can be obtained through one-step hydrosilylation. The obtained modified siloxane polymer is a network polymer (SBD) where chains cross, and chains and networks penetrate each other, providing the polymer with superior solubility while improving the ability of the siloxane to thicken supercritical carbon dioxide. As 3 sets of C=O appear in a polymerization unit from the perspective of the molecular structure, the modified siloxane polymer prepared in the present invention can form hydrogen bonds with more $CO_2$ under the action of Lewis acid-base pairs and has better solubility in supercritical $CO_2$, which facilitates improvement in the solubility and thickening performance of the thickener.

The modified siloxane polymer (SBD) prepared in the present invention is used as a supercritical carbon dioxide thickener. When used, the modified siloxane polymer is prepared into a solution with a mass percent concentration of 1-2%. No cosolvent is required.

The present invention has the following technical features and favourable effects:

1. In the present invention, 1,3-diallyl-1,3,5-triazine-2,4,6-trione is particularly preferred as a polymerization monomer. The prepared modified siloxane polymer, with a more excellent thickening effect and a viscosity ratio increased by up to 285 times, is superior to thickeners reported in the prior art.
2. The modified siloxane polymer prepared in the present invention has more excellent solubility in supercritical $CO_2$, and no cosolvent is required, thereby improving economical efficiency and promoting industrial applications. The method of the present invention is suitable for industrial mass production and can be well applied in oil exploitation.
3. The modified siloxane polymer-based supercritical carbon dioxide thickener (SBD) of the present invention, with good temperature resistance, applies to thickening under different temperature and pressure conditions.
4. The modified siloxane polymer-based supercritical carbon dioxide thickener of the present invention has good compatibility with various fracturing fluids and other oil field working fluids; it is non-toxic and safe in use, and causes less damage to the formation.
5. The modified siloxane polymer-based supercritical carbon dioxide thickener of the present invention can achieve a very good thickening effect at a low dose (1-2%), thereby significantly reducing pollution of the formation, groundwater and surface water while meeting environmental protection requirements of enterprises.
6. The preparation method for the modified siloxane polymer-based supercritical carbon dioxide thickener of the present invention is simple, the product can be obtained through a one-step reaction, and a product yield is up to 95.68%.

BRIEF DESCRIPTION OF THE DRAWINGS

FIG. 3 is a carbon-nuclear magnetic resonance (C-NMR) spectrum of the product (SBD) synthesized in example 1.

FIGS. 4A-4C are experimental phase diagrams of the solubility of the modified siloxane polymer (SBD) prepared in example 1 in supercritical $CO_2$. FIG. 4A shows pure $CO_2$ (298.15 K, 7.48 MPa); FIG. 4B shows $CO_2$+1 wt. % SBD (298.15 K, 10 MPa); and FIG. 4C shows $CO_2$+1 wt. % SBD (305.15 K, 10 MPa).

DETAILED DESCRIPTION OF THE EMBODIMENTS

The present invention will be further described below in conjunction with specific embodiments, but the protection scope of the present invention is not limited to these embodiments. The reactants described in the embodiments were purchased from Shanghai Macklin Biochemical Co., Ltd., and refluxed for impurity removal before use.

Example 1

A preparation method for a modified siloxane-based supercritical carbon dioxide thickener (SBD) includes the following steps:

15.45 g of 1,3-diallyl-1,3,5-triazine-2,4,6-trione was added into a 250 mL three-necked flask with a reflux device. Stirring and heating were started. After the temperature reached 90° C., 40 ppm chloroplatinic acid was added and activated for 2 h. Then 10 g of 1,3,5,7-tetramethylcyclotetrasiloxane (a molar ratio of carbonyl groups of the 1,3-diallyl-1,3,5-triazine-2,4,6-trione to active hydrogens of the 1,3,5,7-tetramethylcyclotetrasiloxane was 1.25:1) was added dropwise with a constant-pressure dropping funnel, and a reaction is kept at a constant temperature of 90° C. for 6 h. 24.35 g of colorless and transparent liquid polymer (SBD) was obtained, with a yield of 95.68%.

Figure 1:
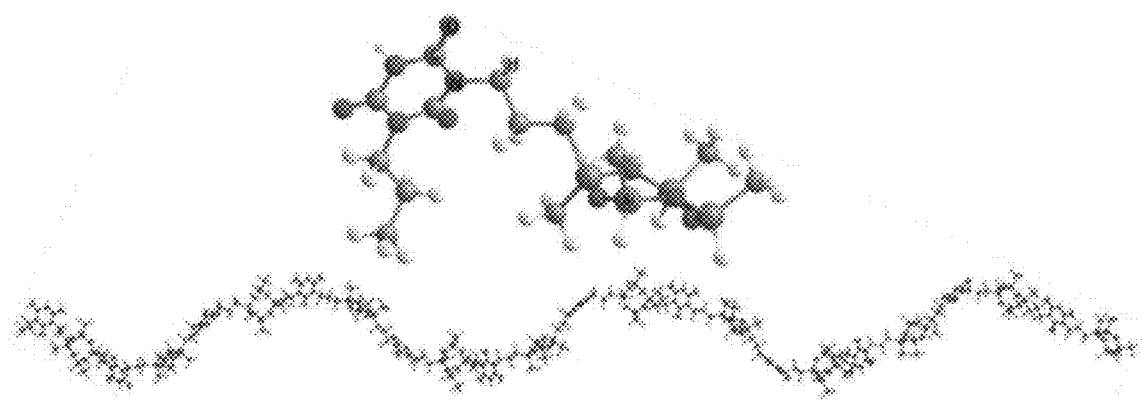
FIG. 1 is a chembio3D photo of a product (SBD) synthesized in example 1, showing that the polymer has a helical structure and a hinge winding force.

The prepared polymer has a weight-average molecular weight of 9,430. Its structure is as shown in FIG. 1.

Figure 2:
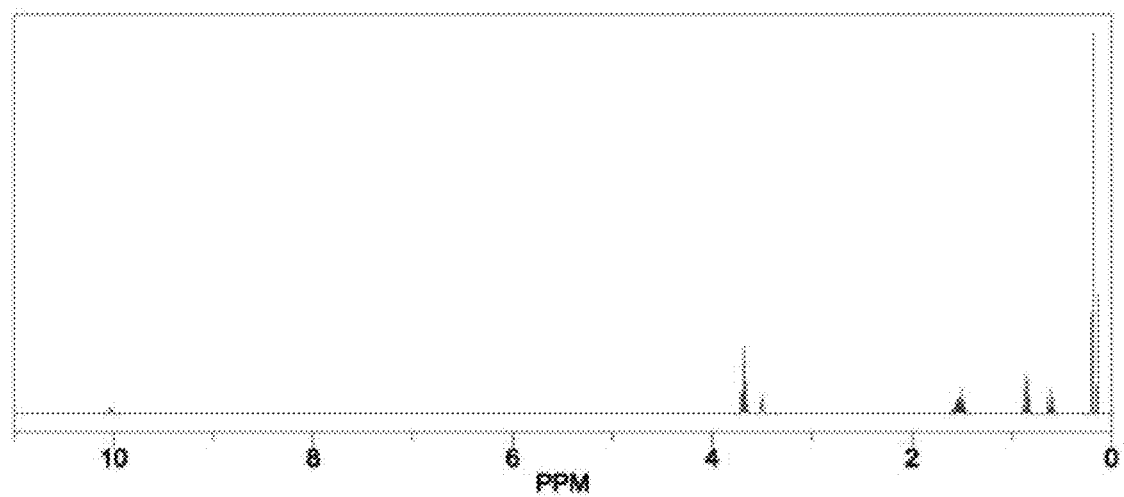
FIG. 2 is a hydrogen-nuclear magnetic resonance (H-NMR) spectrum of the product (SBD) synthesized in example 1.

The NMR spectra of the product (SBD) synthesized in example 1 are as shown in FIG. 2 and FIG. 3. In FIG. 2, H in N—$CH_2$—CH appears at δ=3.68 ppm and δ=1.54 ppm. In FIG. 3, C in 1,3,5,7-tetramethylcyclotetrasiloxane appears at δ=3.9-4.1 ppm, C in C=O appears at δ=148-152 ppm, and N—$CH_2$—CH appears at δ=44-50 ppm and δ=21-22 ppm, indicating that a modified siloxane super polymer (SBD) is successfully synthesized in the present invention.

Example 2

The method is the same as that in example 1 except that a dose of 1,3-diallyl-1,3,5-triazine-2,4,6-trione was 24.73 g (a molar ratio of carbonyl groups of the 1,3-diallyl-1,3,5-triazine-2,4,6-trione to active hydrogens of the 1,3,5,7-tetramethylcyclotetrasiloxane was 2:1). The obtained product was 31.45 g, with a yield of 90.56%.

Example 3

The method is the same as that in example 1 except that a dose of 1,3-diallyl-1,3,5-triazine-2,4,6-trione was 12.36 g (a molar ratio of carbonyl groups of the 1,3-diallyl-1,3,5-triazine-2,4,6-trione to active hydrogens of the 1,3,5,7-tetramethylcyclotetrasiloxane was 1:1), the catalyst activation temperature was 95° C., and the reaction temperature was 95'C. The obtained product was 18.25 g, with a yield of 81.62%.

Example 4

The method is the same as that in example 1 except that a dose of chloroplatinic acid as a catalyst was 50 ppm, the activation temperature was 80° C., and the reaction temperature was 80° C. The obtained product was 20.96 g, with a yield of 82.35%.

Example 5

The method is the same as that in example 1 except that the activation temperature was 100° C., the reaction temperature was 100° C., and the reaction time was 4 h. The obtained product was 20.50 g, with a yield of 80.55%.

Example 6

The method is the same as that in example 1 except that a dose of chloroplatinic acid as a catalyst was 35 ppm, and the reaction time was 8 h. The obtained product was 23.25 g, with a yield of 91.35%.

Example 7

The method is the same as that in example 1 except that the reaction time was 4 h. The obtained product was 23.50 g, with a yield of 92.35%.

Comparative Example 1

The method is the same as that in example 1 except that a dose of chloroplatinic acid as a catalyst was 20 ppm, and the activation temperature and the reaction temperature were 80'C.

Comparative Example 2

The method is the same as that in example 1 except that a molar ratio of carbonyl groups of the 1,3-diallyl-1,3,5-triazine-2,4,6-trione to active hydrogens of the 1,3,5,7-tetramethylcyclotetrasiloxane was 5:1.

Comparative Example 3

The product of example 5 in the specification of CN108003349A, Preparation Method for Siloxane Polymer-Based Supercritical Carbon Dioxide Thickener for Fracturing (with a viscosity ratio increased by up to 149 times).

Experimental Example 1: Comparative Experiment of Polymer Product Performance of Examples and Comparative Examples A product polymer sample was directly dissolved in supercritical $CO_2$ to prepare supercritical $CO_2$ fracturing fluid (simple polymer solution) with a polymer mass concentration of 1%. Under the conditions of 32° C. and 10 MPa, at a shear rate of 240 $s^{-1}$, the viscosity of the sample was tested with a capillary differential pressure gauge. The data of the viscosity ratio (compared with pure carbon dioxide) are as shown in Table 1.

TABLE 1

Evaluation results of shear viscosity resistance

| Sample No. | Viscosity value (MPa · s) | Viscosity ratio (times) |
|---|---|---|
| Example 1 | 11.4 | 285 |
| Example 2 | 9.52 | 238 |
| Example 3 | 9.8 | 245 |
| Example 4 | 10.76 | 269 |
| Example 5 | 8.52 | 213 |
| Example 6 | 8.96 | 224 |
| Example 7 | 8.72 | 218 |
| Comparative Example 1 | 7.2 | 180 |
| Comparative Example 2 | 4.8 | 120 |
| Comparative Example 3 | / | 149 |

Note:
Measurement conditions of comparative example 3: 2% polymer solution, 25° C. and 8 MPa (refer to the specification of CN108003349A).

Experimental Example 2: Temperature Resistance Experiment of Modified Siloxane Polymer (SBD) Prepared in the Present Invention A supercritical $CO_2$ fracturing fluid (simple polymer solution) with a polymer concentration of 1% was prepared from the product in example 1. Under the condition of 10 MPa, at a shear rate of 240 $s^{-1}$, the viscosity of the sample was tested with a capillary differential pressure gauge at different temperatures. The data for the viscosity ratio (compared with pure carbon dioxide) are shown in Table 2. The results show the temperature resistance is good.

TABLE 2

Experiment results of temperature resistance

| Temperature (° C.) | Viscosity ratio (times) |
|---|---|
| 32 | 285 |
| 36 | 280 |
| 40 | 265 |
| 44 | 250 |
| 48 | 220 |

Experimental Example 3: Experiment of Solubility of Modified Siloxane Polymer (SBD) Prepared in the Present Invention in Supercritical $CO_2$ The experiment without a cosolvent includes the following steps:

(1) A visualized container was filled with pure $CO_2$ (a clear and translucent phase diagram is as shown in FIG. 4A).

(2) At room temperature, the 1 wt. % SBD thickener (prepared in example 1) was added to the visualized container, the visualized container was then filled with $CO_2$ and pressurized to 10 MPa, and the mixture was stirred evenly (a phase diagram is as shown in FIG. 4B).

(3) The container in step (2) was put into h in a 305.15 K constant-temperature box and left to stand for 12. The visualized container was shaken and no turbidity was observed in the internal fluid (a phase diagram is as shown in FIG. 4C).

a: pure $CO_2$ (298.15 K, 7.48 MPa);
b: $CO_2$+1 wt. % SBD (298.15 K, 10 MPa);
c: $CO_2$+1 wt. % SBD (305.15 K, 10 MPa).

What is claimed is:

1. A preparation method for a modified siloxane-based supercritical carbon dioxide thickener, comprising the following steps:
   adding 1,3-diallyl-1,3,5-triazine-2,4,6-trione into a reactor, stirring and heating to 60-120° C., adding chloroplatinic acid as a catalyst and keeping the catalyst activated for 1-3 h, wherein a catalyst activation temperature is 60-100° C.;
   adding dropwise 1,3,5,7-tetramethylcyclotetrasiloxane, wherein a molar ratio of carbonyl groups of the 1,3-diallyl-1,3,5-triazine-2,4,6-trione to active hydrogens of the 1,3,5,7-tetramethylcyclotetrasiloxane is (1-4):1; and
   conducting hydrosilylation at 70-110° C. to obtain a modified siloxane polymer (SBD), wherein the SBD is the modified siloxane-based supercritical carbon dioxide thickener.

2. The preparation method for the modified siloxane-based supercritical carbon dioxide thickener of claim 1, wherein the molar ratio of the carbonyl groups of the 1,3-diallyl-1,3,5-triazine-2,4,6-trione to the active hydrogens of the 1,3,5,7-tetramethylcyclotetrasiloxane is (1-2): 1.

3. The preparation method for the modified siloxane-based supercritical carbon dioxide thickener of claim 1, wherein:
   the catalyst activation temperature is 80-90° C.; and
   a hydrosilylation temperature is the same as the catalyst activation temperature.

4. The preparation method for the modified siloxane-based supercritical carbon dioxide thickener of claim 1, wherein dose of the chloroplatinic acid as the catalyst is 25-60 ppm.

5. The preparation method for the modified siloxane-based supercritical carbon dioxide thickener of claim 1, wherein a hydrosilylation time is 2-20 h.

6. The preparation method for the modified siloxane-based supercritical carbon dioxide thickener of claim 1, wherein the modified siloxane polymer has a weight-average molecular weight of 8,000-11,000.

7. The modified siloxane-based supercritical carbon dioxide thickener of claim 1, having a structure shown in formula I:

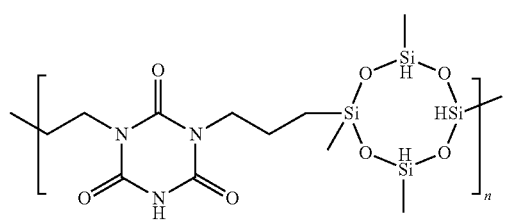

formula I wherein n=17-24.

8. The modified siloxane-based supercritical carbon dioxide thickener of claim 2, having a structure shown in formula I:

formula I

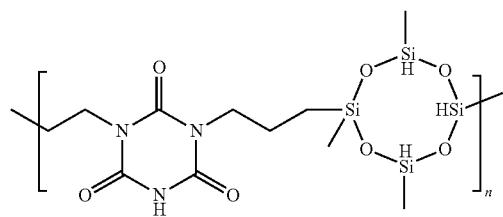

wherein n=17-24.

9. The modified siloxane-based supercritical carbon dioxide thickener of claim 3, having a structure shown in formula I:

formula I

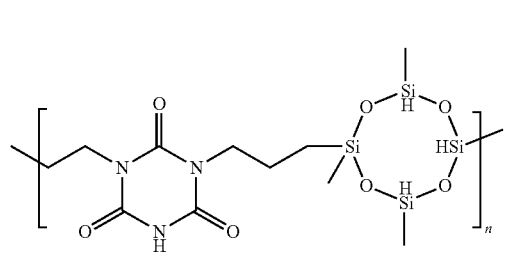

wherein n=17-24.

10. The modified siloxane-based supercritical carbon dioxide thickener of claim 4, having a structure shown in formula I:

formula I

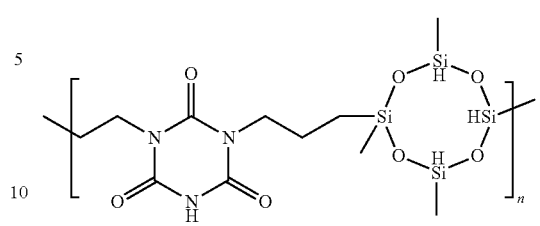

wherein n=17-24.

11. The modified siloxane-based supercritical carbon dioxide thickener of claim 5, having a structure shown in formula I:

formula I

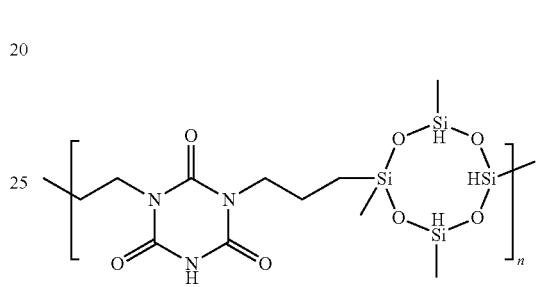

wherein n=17-24.

* * * * *